(12) United States Patent
Jung

(10) Patent No.: US 9,915,332 B1
(45) Date of Patent: Mar. 13, 2018

(54) MOTOR VEHICLE CLUTCH ASSEMBLY INCLUDING SHOCK ABSORBER FOR SMOOTHING CLUTCH ENGAGEMENT

(71) Applicant: Schaeffler Technologies AG & Co. KG, Herzogenaurach (DE)

(72) Inventor: Seokyeol Jung, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/334,629

(22) Filed: Oct. 26, 2016

(51) Int. Cl.
*F16H 45/02* (2006.01)
*F16D 13/54* (2006.01)
*F16D 13/58* (2006.01)

(52) U.S. Cl.
CPC ............. *F16H 45/02* (2013.01); *F16D 13/54* (2013.01); *F16D 13/58* (2013.01); *F16D 2250/0023* (2013.01); *F16D 2300/22* (2013.01); *F16H 2045/0284* (2013.01)

(58) Field of Classification Search
CPC .......... F16H 45/02; F16D 13/54; F16D 13/58; F16D 2250/0023; F16D 2300/22; F16D 2045/0284
See application file for complete search history.

(56) References Cited

U.S. PATENT DOCUMENTS

| | | | |
|---|---|---|---|
| 4,649,771 A * | 3/1987 | Atkinson | F16H 3/54 192/53.1 |
| 6,378,675 B1 * | 4/2002 | Kundermann | F16D 21/06 192/3.27 |
| 6,688,441 B1 * | 2/2004 | Arhab | F16H 45/02 192/3.29 |
| 7,028,820 B2 * | 4/2006 | Johann | F16H 45/02 192/3.26 |
| 7,874,415 B2 * | 1/2011 | Agner | F16D 13/52 192/113.34 |
| 8,276,723 B2 * | 10/2012 | Verhoog | F16H 45/02 192/3.29 |
| 9,080,616 B2 | 7/2015 | Luipold et al. | |
| 9,193,009 B2 * | 11/2015 | Chambrion | F16D 13/04 |
| 9,249,871 B2 * | 2/2016 | Aoki | F16H 45/02 |
| 9,303,747 B2 * | 4/2016 | Mototsune | F16H 45/02 |

(Continued)

FOREIGN PATENT DOCUMENTS

WO  WO 2016/130269 A1  8/2016

*Primary Examiner* — Jacob S Scott
*Assistant Examiner* — Tinh Dang
(74) *Attorney, Agent, or Firm* — Davidson, Davidson & Kappel, LLC

(57) ABSTRACT

A motor vehicle clutch assembly is provided. The motor vehicle clutch assembly includes a clutch pack including a first clutch plate; an axially movable piston for engaging the clutch pack; and a shock absorber fixed to the first clutch plate. The shock absorber is configured to contact the piston and elastically deform during engagement of the clutch pack by the piston to absorb torque shock from the piston. A method of forming a motor vehicle clutch assembly is also provided. The method includes providing a clutch pack including a first clutch plate; providing an axially movable piston for engaging the clutch pack; and fixing a shock absorber to the first clutch plate. The shock absorber is configured to contact the piston and elastically deform during engagement of the clutch pack by the piston to absorb torque shock from the piston.

19 Claims, 2 Drawing Sheets

(56) References Cited

U.S. PATENT DOCUMENTS

| | | | |
|---|---|---|---|
| 9,631,679 B2* | 4/2017 | Adachi | F16D 13/54 |
| 2011/0192691 A1* | 8/2011 | Murata | F16H 45/02 |
| | | | 192/3.3 |
| 2013/0230385 A1* | 9/2013 | Lindemann | F16D 33/18 |
| | | | 415/122.1 |
| 2017/0268579 A1* | 9/2017 | Matsuda | F16D 13/52 |

* cited by examiner

MOTOR VEHICLE CLUTCH ASSEMBLY INCLUDING SHOCK ABSORBER FOR SMOOTHING CLUTCH ENGAGEMENT

The present disclosure relates generally to motor vehicle clutch assemblies and more specifically to a shock absorber for smoothing clutch engagement.

BACKGROUND

U.S. Pat. No. 9,080,616 B2 discloses a transmission piston with a contained return spring and pre-loaded spring. WO 2016/130269 A1 discloses a first resilient element for at least one cover and a drive flange and a second resilient element for urging a turbine assembly away from a cover assembly. U.S. application Ser. No. 15/140,757 discloses a spacer plate to capture the diaphragm spring for a coast engagement damper design. U.S. application Ser. No. 15/004,110 discloses a bias/diaphragm spring located between the flange and the turbine.

SUMMARY OF THE INVENTION

A motor vehicle clutch assembly is provided. The motor vehicle clutch assembly includes a clutch pack including a first clutch plate; an axially movable piston for engaging the clutch pack; and a shock absorber fixed to the first clutch plate. The shock absorber is configured to contact the piston and elastically deform during engagement of the clutch pack by the piston to absorb torque shock from the piston.

A torque converter including the clutch is also provided.

A method of forming a motor vehicle clutch assembly is also provided. The method includes providing a clutch pack including a first clutch plate; providing an axially movable piston for engaging the clutch pack; and fixing a shock absorber to the first clutch plate. The shock absorber is configured to contact the piston and elastically deform during engagement of the clutch pack by the piston to absorb torque shock from the piston.

BRIEF DESCRIPTION OF THE DRAWINGS

The present invention is described below by reference to the following drawings, in which.

DETAILED DESCRIPTION

The disclosure provides leaf springs to connect a clutch pack including multiples clutch plates, rather than supporting clutch plates with a carrier ring. A riveted cushion spring is added to absorb torque shock when lockup is engaged.

Figure 1:
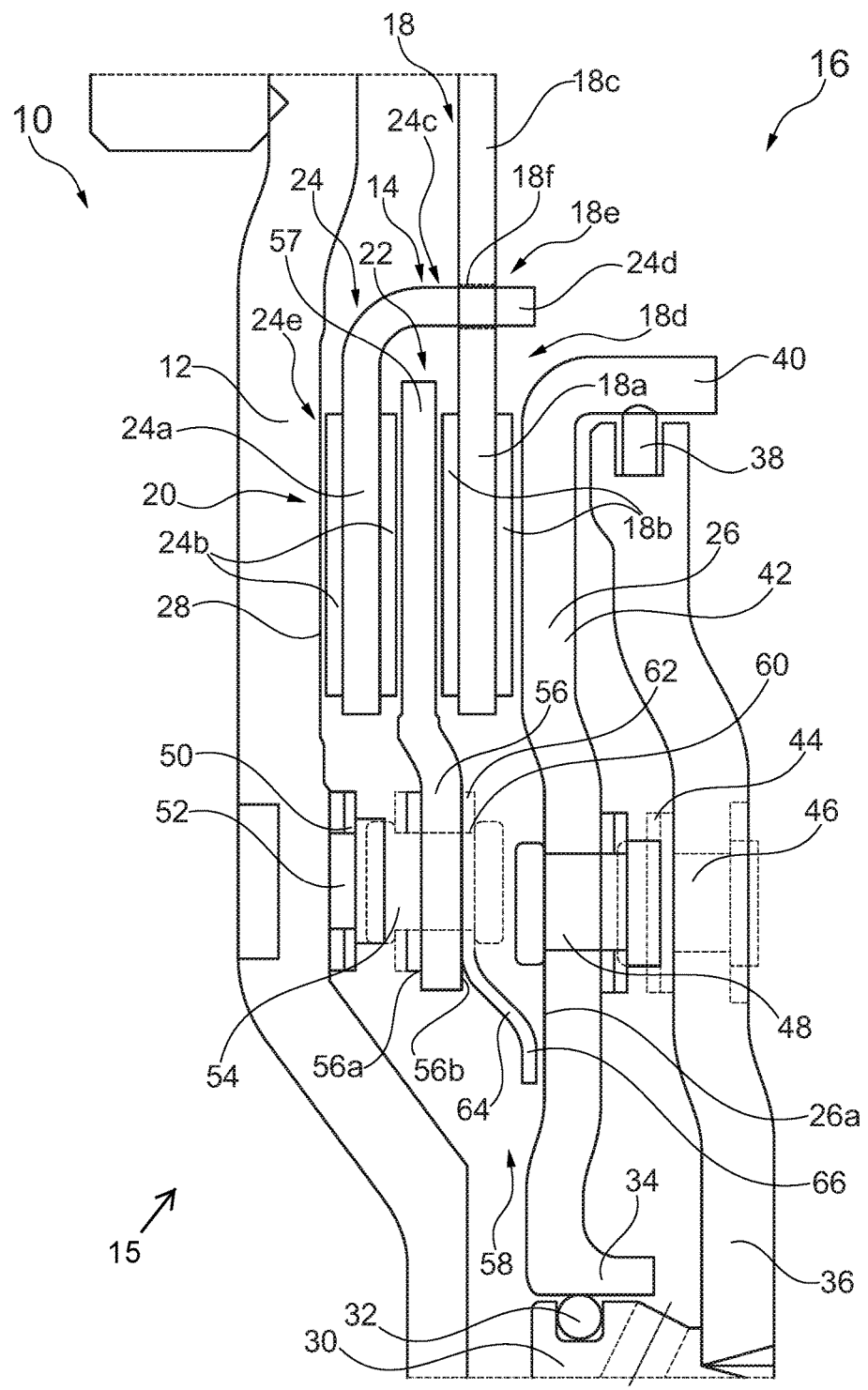
FIG. 1 shows a cross-sectional side view of a torque converter according to an embodiment of the present invention.

FIG. 1 shows a cross-sectional side view of a torque converter 10 in accordance with an embodiment of the present invention. Torque converter 10 is rotatable about a center axis and includes a front cover 12 for connecting to a crankshaft of an internal combustion engine. The terms axially, radially and circumferentially as used herein are used with respect to the center axis about which torque converter rotates during operation. Torque converter 10, in a known manner, also includes a turbine including a plurality of turbine blades, an impeller including a plurality of impeller blades and a stator including a plurality of stator blades axially between the turbine and the impeller. During operation, the impeller is rotated via the internal combustion engine, causing the impeller blades to create a fluid flow that drives the turbine blades. The fluid is redirected from the turbine back to the impeller by the stator blades.

Torque converter 10 also includes a damper assembly connecting the turbine to a lockup clutch 14 of a clutch assembly 15. More specifically, the damper assembly is connected to a radially outer radial portion 16 of a first clutch plate 18 of a clutch pack 20 of lockup clutch 14. Clutch pack 20, in addition to clutch plate 18, in this embodiment includes two additional clutch plates 22, 24; however, in other embodiments, the number of clutch plates in the clutch pack can be different than three. Clutch plate 18 includes a radially outer portion 18c that is connected to the damper assembly and a radially inner portion 18d for clutch engagement. Between the radially outer portion 18c and the radially inner portion 18d, clutch plate 18 includes an intermediate portion 18e supporting an axially extending rim 24c of clutch plate 24. More specifically, intermediate portion 18e includes circumferentially spaced slots 18f extending axially therethrough, with each of slots 18f receiving one of a plurality of circumferentially spaced tabs 24d of rim 24c that extend axially through slots 18f. Radially inside of rim 24c, clutch plate 24 includes a radially inner portion 24e for clutch engagement.

Lockup clutch 14 further includes a piston 26 for engaging clutch pack 20 by forcing clutch pack 20 against an inner surface 28 of front cover 12. More specifically, piston 26 contacts first clutch plate 18 and forces clutch plate 18 to force clutch plates 22, 24 toward the engine such that clutch plate 24 contacts inner surface 28. Clutch plates 18, 24 each include a metal base plate 18a, 24a and friction material 18b, 24b on both radially extending and axially facing surfaces of base plates 18a, 24a, respectively. In other arrangements, clutch plate 22, piston 26 and/or inner surface 28 can include friction material in place of one or more of friction material 18b, 24b. During engagement, piston 26 contacts friction material 18b of plate 18 and friction material 24b of plate 24 is pressed against inner surface 28 of front cover 12.

Piston 26 is axially slidable along a hub section 30 that is non-rotatably fixed to front cover 12. Hub section 30 is provided with a seal ring 32 in a groove at an outer circumferential surface thereof. An inner circumferential surface of an inner axially extending ring section 34 of piston 26 contacts seal ring 32 such that piston 26 is sealed with respect to hub section 30 at an innermost circumferential surface of piston 26. A radially extending support plate 36 is fixed to hub section 30 for example by welding. Support plate 36 protrudes radially outward from hub section 30 and is provided with a seal ring 38 at an outer circumferential surface thereof for contacting an inner circumferential surface of an outer axially extending ring section 40 of piston 26. Piston 26 further includes a radially extending ring section 42 extending radially outward from inner ring section 34 to outer ring section 40. Piston 26 is elastically connected to support plate 36 by a plurality of circumferentially spaced elastic connectors, which in this embodiment are the form of leaf springs 44, such that piston 26 is axially movable away from support plate 26 to engage the lockup clutch 14, but is preloaded away from the clutch pack 20 in a coast condition. Each leaf spring 44 is fixed to support plate 36 by a respective first fastener, in the form of a first rivet 46, passing through support plate 36 and is fixed to piston 26 by a respective second fastener, in the form a second rivet 48, passing through ring section 42 of piston 26.

Clutch plate 22 is also elastically connected to front cover 12 by a plurality of circumferentially spaced elastic connectors, which in this embodiment are the form of leaf springs 50, such that piston 26 is axially movable with respect to front cover 12 during clutch engagement and disengagement. Each leaf spring 50 is fixed to front cover 12 by a respective first fastener, in the form of an extruded rivet 52 formed from front cover 12, and is fixed to clutch plate 22 by a respective second fastener, in the form a rivet 54 passing through a radially inner portion 56 of clutch plate 22. A radially outer portion 57 of clutch plate 22 is position axially between clutch plates 18, 24. Leaf springs 50 are fixed to an engine-side facing radially extending surface 56a of radially inner portion 56.

Lockup clutch 14 further includes a shock absorber in the form of a cushion spring 58 fixed to a transmission-side facing radially extending surface 56b of radially inner portion 56 of clutch plate 22. Cushion spring 58 is fixed to clutch plate 22 by rivets 54, which each extend through a hole in one of leaf springs 50 and through one of the circumferentially spaced holes 60 in a base portion 62 of cushion spring 58. Base portion 62 extends radially and includes an engine-side facing surface that rests flush against radially extending surface 56b of radially inner portion 56. Cushing spring 58 further includes an axially and radially extending intermediate portion 64 that protrudes axially away from clutch plate 22 toward piston 26. At an end of cushion spring 58 opposite of base portion 62, cushion spring 58 includes a contact portion 66 for contacting an engine-side facing surface 26a of piston 26. In this embodiment, contact portion 66 extends radially inward from intermediate portion 64. During clutch engagement, piston 26 is forced against contact portion 66 of cushion spring 58, forcing cushion spring 58 to elastically deform such that intermediate section 64 bends away from piston 26 and contact portion 66 is forced toward front cover 12. In turn, cushion spring 58 absorbs torque shock on clutch pack 20 from piston 26 and controls the engagement of clutch pack 20 via piston 26. More specifically, cushion spring 58 decreases the axial force applied by piston 26 to clutch plate 18 by applying axial resistance to piston 26 during clutch engagement.

Figure 2A:
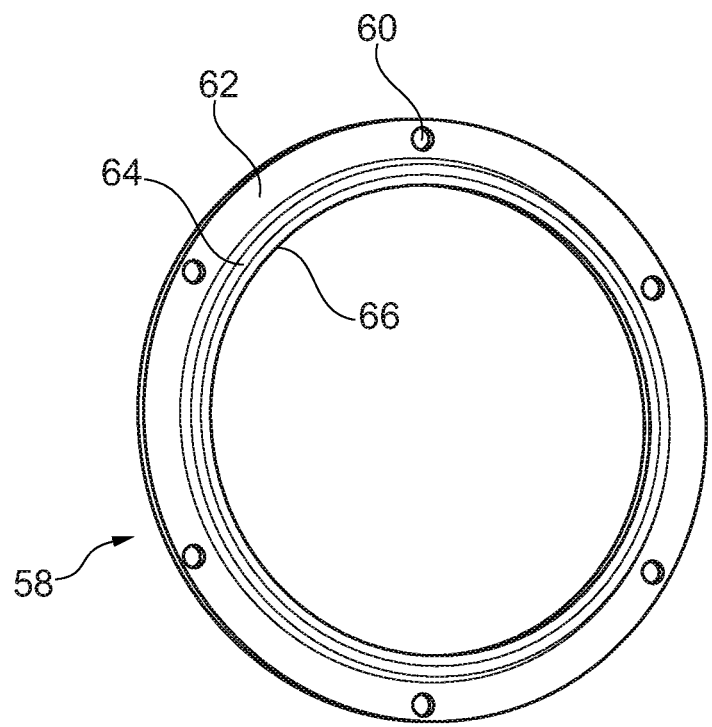
FIG. 2a shows a cushion spring of the torque converter in accordance with a first embodiment.
Figure 2B:
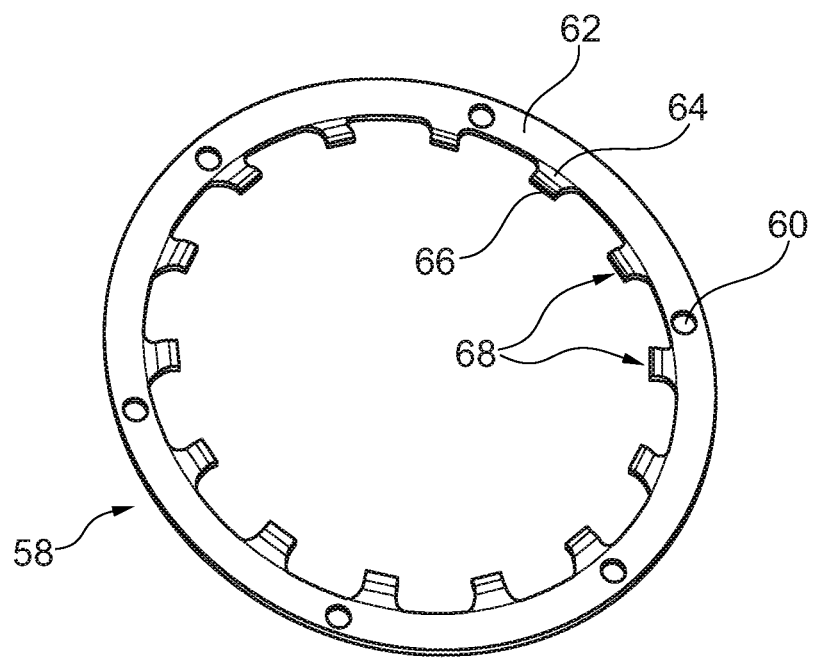
FIG. 2b shows a cushion spring of the torque converter in accordance with a second embodiment.

As shown in FIG. 2a, in one embodiment, all of base portion 62, intermediate portion 64 and contact portion 66 are each formed by a continuous ring. As shown in FIG. 2b, in another embodiment, base portion 62 is formed by a continuous ring and intermediate portion 64 and contact portion 66 are formed by a plurality of circumferentially spaced fingers 68 protruding from base portion 62. As shown in both of FIGS. 2a, 2b, base portion 62 includes a plurality of circumferentially spaced holes 60, each for receiving one of rivets 54.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A motor vehicle clutch assembly comprising:
  a clutch pack including a first clutch plate;
  an axially movable piston for engaging the clutch pack; and
  a shock absorber fixed to the first clutch plate, the shock absorber configured to contact the piston and elastically deform during engagement of the clutch pack by the piston to absorb torque shock from the piston.

2. The motor vehicle clutch assembly as recited in claim 1 wherein the shock absorber is a cushion spring including a base portion fixed to first clutch plate and a contact portion for contacting an engine-side surface of the piston.

3. The motor vehicle clutch assembly as recited in claim 2 wherein the cushion spring further includes an axially and radially extending intermediate portion connecting the contact portion to the base portion, the intermediate portion configured for bending away from the piston during engagement of the clutch pack via the piston.

4. The motor vehicle clutch assembly as recited in claim 1 further comprising a front cover, the first clutch plate being elastically connected to the front cover by at least one first elastic connector.

5. The motor vehicle clutch assembly as recited in claim 4 wherein the at least one first elastic connector is formed by a plurality of circumferentially spaced leaf springs.

6. The motor vehicle clutch assembly as recited in claim 5 wherein each of the leaf springs is connected to the first clutch plate by a respective fastener, the fasteners fixing the shock absorber to the first clutch plate.

7. The motor vehicle clutch assembly as recited in claim 4 further comprising a hub section fixed to the front cover and a radially extending support plate fixed to hub section, the piston being sealingly slidable axially along the front cover and the support plate.

8. The motor vehicle clutch assembly as recited in claim 7 wherein the piston is elastically connected to the support plate by at least one second elastic connector.

9. The motor vehicle clutch assembly as recited in claim 1 wherein the first clutch plate includes a radially outer portion for engaging other clutch plates of the clutch pack and a radially inner portion to which the shock absorber is fixed.

10. A torque converter including the motor vehicle clutch assembly as recited in claim 1.

11. A method of forming a motor vehicle clutch assembly comprising:
  providing a clutch pack including a first clutch plate;
  providing an axially movable piston for engaging the clutch pack; and
  fixing a shock absorber to the first clutch plate, the shock absorber configured to contact the piston and elastically deform during engagement of the clutch pack by the piston to absorb torque shock from the piston.

12. The method as recited in claim 11 wherein the shock absorber is a cushion spring including a base portion fixed to first clutch plate and a contact portion for contacting an engine-side surface of the piston.

13. The method as recited in claim 12 wherein the cushion spring further includes an axially and radially extending intermediate portion connecting the contact portion to the base portion, the intermediate portion configured for bending away from the piston during engagement of the clutch pack via the piston.

14. The method as recited in claim 11 further comprising elastically connecting the first clutch plate to a front cover by at least one first elastic connector.

15. The method as recited in claim 14 wherein the at least one first elastic connector is formed by a plurality of circumferentially spaced leaf springs.

16. The method as recited in claim 15 wherein each of the leaf springs is connected to the first clutch plate by a respective fastener, the fasteners fixing the shock absorber to the first clutch plate.

17. The method as recited in claim 14 further comprising fixing a hub section to the front cover and fixing a radially extending support plate to hub section, the piston being sealingly slidable axially along the front cover and the support plate.

18. The method as recited in claim 17 further comprising elastically connecting the piston to the support plate by at least one second elastic connector.

19. The method as recited in claim 11 wherein the first clutch plate includes a radially outer portion for engaging other clutch plates of the clutch pack and a radially inner portion to which the shock absorber is fixed.

* * * * *